Sept. 19, 1961      W. E. BROWN      3,001,006

TERMINAL CONNECTION

Filed Oct. 27, 1958

INVENTOR.
William E. Brown
BY
His Attorney

United States Patent Office 3,001,006
Patented Sept. 19, 1961

3,001,006
TERMINAL CONNECTION
William E. Brown, Anderson, Ind., assignor to General Motors Corporation, Detroit, Mich., a corporation of Delaware
Filed Oct. 27, 1958, Ser. No. 769,662
10 Claims. (Cl. 174—153)

This invention relates to terminals and more particularly to a method of forming an anti-turn terminal connection between a terminal and a plate member such as the frame of a dynamoelectric machine.

In the past electrical apparatus, considerable difficulty has been encountered in providing a terminal connection that will not turn relative to the part through which the terminal passes. The problem becomes increasingly acute in the case of dynamoelectric machines wherein the terminal passes through the frame of the machine and must be electrically insulated therefrom. In dynamoelectric machines, it is important to prevent turning of the terminal with respect to the frame of the machine so that the likelihood of lead wires attached to the terminal being broken or severely strained is eliminated.

It is accordingly, a primary object of this invention to provide a terminal connection wherein the terminal passes through a plate member and wherein means are provided for preventing turning of the terminal with respect to the plate member.

Another object of this invention is to provide a terminal connection for a dynamoelectric machine wherein the terminal passes through the frame of the machine and wherein means are provided for preventing rotation of the terminal with respect to the frame of the machine.

A more specific object of this invention is to provide a terminal connection for a dynamoelectric machine by forming a hole in the frame of the machine that is formed by a punching operation that employs a cylindrical punch and a polygonal die that may be hexagonal. The punch preferably has an outside diameter that is sized to just permit the punch to pass into the die with the sides of the die being located substantially tangent to the cylindrical punch. When a hole is formed with these tools, burrs are formed at the corners of the polygon which serve an important function in the terminal assembly. When the hole is formed as aforesaid, a terminal stud having external threads is passed through the hole with an insulating washer of hard compressible material being interposed between the head of the stud and the polygonal side of the hole. If a nut is now threaded on to the stud and drawn up tight, the insulating washer is forced into the polygonal side of the hole and the burrs bite into the insulating washer. The head of the stud preferably has teeth which bite into the opposite side of the insulating washer and in this manner the terminal stud is possibly prevented from rotating with respect to the dynamoelectric machine frame even when the stud is subjected to greater torque forces than those normally encountered in service.

Further objects and advantages of the present invention will be apparent from the following description, reference being had to the accompanying drawings wherein a preferred embodiment of the present invention is clearly shown.

Figure 1:
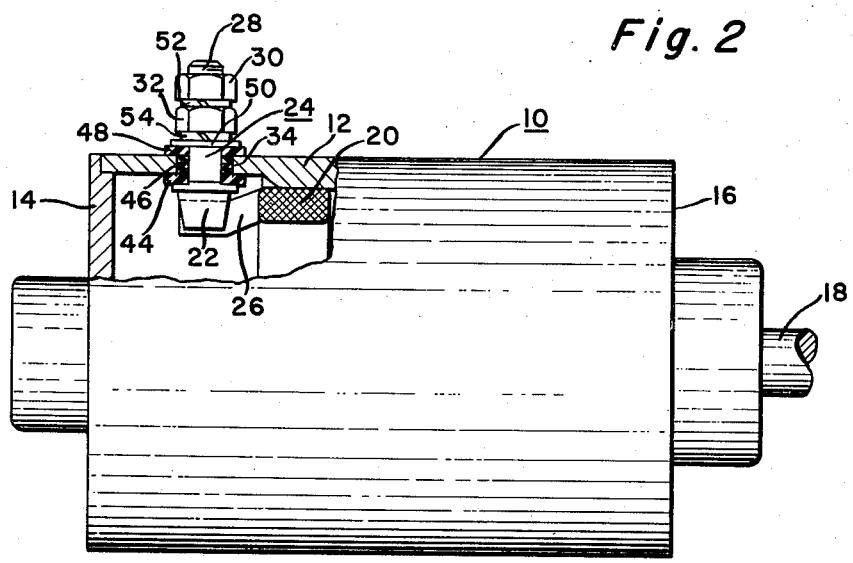
FIGURE 1 is a side view with parts broken away of a dynamoelectric machine illustrating a terminal connection made in accordance with this invention.

Referring now to the drawings and more particularly to FIGURE 1, the terminal connection of this invention is illustrated for use with a dynamoelectric machine generally designated by reference numeral 10. The dynamoelectric machine has a main frame 12 and a pair of end frames 14 and 16, all of which are formed of metal such as steel. The dynamoelectric machine 10 may be either a motor or generator and has a rotatable armature (not shown) fixed to shaft 18. The dynamoelectric machine has a field winding 20 which is electrically connected to the head 22 of a terminal stud generally designated by reference numeral 24. The field winding 20 is connected to the head of the terminal stud by a strap connector 26 of any conventional construction which is welded or otherwise secured to the head of the terminal stud. The terminal stud 24 has a threaded portion 28 which engages the internal threaded portions of nuts 30 and 32 when the nuts are threaded on to the terminal stud. It will be appreciated that the terminal stud forms an electrical connection between the exterior and interior sides of the dynamoelectric machine.

Figure 3:
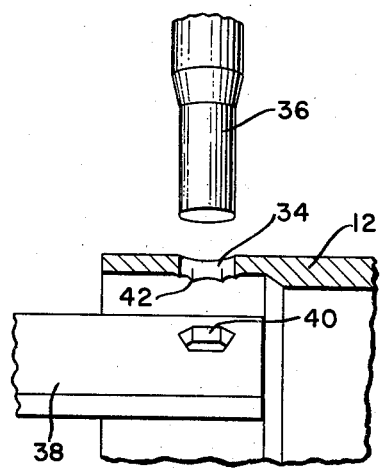
FIGURE 3 illustrates the configuration of the tools employed for forming a hole in the frame of the dynamoelectric machine illustrated in FIGURE 1.
Figure 4:
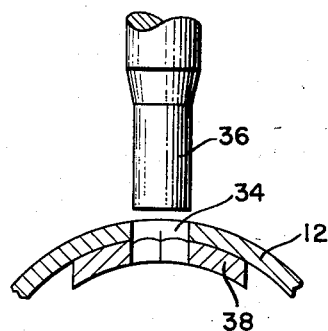
FIGURE 4 is a view similar to FIGURE 3 but illustrating the tools in place for forming a hole in the frame of the dynamoelectric machine.

The terminal stud connection of this invention is made by first forming a hole 34 in the frame 12 of the dynamoelectric machine. This hole 34 is formed with the tools illustrated in FIGURES 3 and 4. Thus as shown in FIGURE 3, a punch designated by reference numeral 36, has a circular cross section. A die 38 is provided having an opening 40 which has a polygonal cross section which in this case is a hexagon. The punch has a diameter that permits it to just pass through the opening 40 with the side walls of the opening 40 being located substantially tangent to the cylindrical punch. When the die and punch are positioned on opposite sides of the frame 12 of the dynamoelectric machine, the punch is moved downwardly to form the hole 34. This hole will have a circular cross section over a majority of its length but the part of the hole facing the interior of the frame 12 will have a hexagonal cross section. In other words, when the hole is viewed from the exterior of the frame 10, it appears as a circle but when the hole is viewed from the interior of the frame 12, the hole will appear as a hexagon. During the punching operation, a plurality of burrs designated by reference numeral 42 are formed which are located at the corners of the hexagon.

Figure 2:
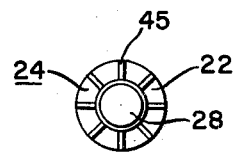
FIGURE 2 is an end view of the terminal stud illustrated in FIGURE 1.

When the hole 34 is formed as aforesaid, an insulating washer 44 formed of suitable electrical insulating material is threaded over the terminal stud 24 and rests against the head 22 of the terminal stud. The head 22, as is illustrated in FIGURE 2, has a plurality of teeth 45 spaced circumferentially around the head. The insulating washer 34 is preferably formed of hard but compressible insulating material such as paper, although it will be readily appreciated that this insulating washer might be formed of any suitable electrical insulating material which may be compressed. When the insulating washer 44 has been threaded onto the terminal stud, a plurality of insulating washers 46 of small diameter are also threaded onto the terminal stud. The terminal stud is then moved through the opening 34 in the frame 12 and the insulating washers 44 and 46 take the positions shown in FIGURE 1 with the washers 46 insulating the stud from the side walls of the hole 34, and with the insulating washer 44 abutting the area surrounding the opening 34. A second insulating washer 48 is then slipped over the terminal stud as is another metal washer 50. The nuts 30 and 32 are then fitted to the terminal stud 28, there being a pair of lock washers 52 and 54 positioned on the terminal stud as shown in FIGURE 1.

When all of the parts have been positioned as shown in FIGURE 1, the nut 32 is tightened to draw the head of the terminal stud 24 upwardly. During the tightening of nut 32, the insulating washer 44 is forced into the hexagonal side of the hole 34 and the burrs 42 bite into the insulating washer 44. In addition, during this tightening operation, the teeth 45 projecting from the head 22 of the terminal stud bite into the opposite side of the compressible insulating washer 44. When the nut 32 has been completely tightened, the washer 44 is prevented from rotation with respect to frame 12 by reason of it being forced into the hexagonal side of the hole and by reason of the fact that the burrs 42 bite into the insulating washer. The head of the terminal stud is prevented from rotating with respect to insulating washer 44 due to the fact that the teeth 45 bite into the opposite side of the insulating washer 44. It has been found that this particular terminal connection prevents a rotation of the terminal stud 34 with respect to frame 12 even when very high torque forces are applied. It will be appreciated that the nut 30 may be unthreaded from the terminal stud in order that an electrical connector may be slipped over the terminal stud and the nut is then once more threaded onto the terminal stud to hold the electrical connector in place.

While the embodiment of the present invention as herein disclosed constitutes a preferred form, it is to be understood that other forms might be adopted.

What is claimed is as follows:

1. A terminal connection for electrically connecting opposite sides of a plate member comprising a hole in said plate member having a circular cross section over a portion of its length and a polygonal cross section over the remainder of its length, a terminal stud passing through said hole having a head located adjacent the polygonal side of the hole, a compressible washer interposed between said head and said plate member, and fastener means engaging said stud member, and reactive against said plate member for causing said compressible washer to be forced axially into the polygonal side of said hole when said means is tightened.

2. A terminal connection for connecting opposite sides of a plate member comprising, a hole in said plate member having circular cross section over a portion of its length and a polygonal cross section over the remainder of its length, a fastener passing through said hole having a head located adjacent the polygonal side of the hole, a compressible washer interposed between said head and said plate member, and fastener means engaging said fastener member and reactive against said plate member for causing said compressible washer to be forced axially into the polygonal side of said opening when said means is tightened, the head of said fastener being of greater diameter than the diameter of the polygonal portion of the hole to enhance the axial forcing of said compressible washer.

3. A terminal connection for electrically connecting opposite sides of a plate member comprising, a hole in said plate member having a circular cross section over a portion of its length and a polygonal cross section over the remainder of its length, a terminal stud member passing through said hole, having a head located adjacent the polygonal side of the hole, a compressible washer interposed between said head and said plate member and initially located entirely out of said hole, fastener means engaging said stud member and reactive against said plate member for causing said compressible washer to be forced axially into the polygonal side of said opening when said means is tightened, and means for preventing rotation of said terminal stud with respect to said insulating washer.

4. A terminal connection for electrically connecting opposite sides of a plate member comprising, a hole in said plate member having a circular cross section over a portion of its length and a polygonal cross section over the remainder of its length, a terminal stud member having external threads fitting within said hole and having a head located adjacent the polygonal side of the hole, a compressible washer interposed between said head and said plate member, a nut threaded on said threaded portion of said terminal stud for tightening said connection, and a plurality of teeth extending from the head of said terminal stud and biting into said insulating washer, said compressible washer being initially located entirely out of said hole and being axially compressed into said hole when said nut is tightened.

5. A terminal connection for electrically connecting opposite sides of a plate member comprising, a hole in said plate member having circular cross section over a portion of its length and a polygonal cross section over the remainder of its length, said plate having a plurality of burrs extending from the corners of said polygonal side of said hole which project from a wall of said plate member, a terminal stud member passing through said hole having a head located adjacent the polygonal side of the hole, a compressible washer interposed between said head and said plate member, a nut threaded onto said stud member and reactive against said plate member for causing said compressible washer to be forced axially into the polygonal side of said opening when said nut is tightened, said burrs biting into said compressible washer when said nut is tightened, and means extending from the head of said terminal stud and biting into said compressible washer when said nut is tightened.

6. A terminal connection for electrically connecting opposite sides of a metal frame of a dynamoelectric machine comprising, a hole in said frame having circular cross section over a portion of its length and a polygonal cross section over the remainder of its length, a terminal stud member passing through said hole having a head located adjacent the polygonal side of the hole, means for insulating said terminal stud from said frame including a compressible washer having at least a portion thereof located about the hole interposed between said head and said frame, a nut threaded onto said terminal stud for tightening said connection and for forcing said compressible washer axially into the polygonal side of said hole, and a plurality of teeth extending from the head of said terminal stud and biting into said compressible washer.

7. A terminal connection for a dynamoelectric machine having a metal frame through which passes a terminal stud comprising, a hole in said frame having a circular cross section over a portion of its length and a polygonal cross section over the remainder of its length, a plurality of burrs extending from said frame and located at the corners of the polygonal side of said hole, a terminal stud member passing through said hole having a head located adjacent the polygonal side of the hole, means insulating said terminal stud from said frame including a compressible washer interposed between said head and said plate member, a nut threaded onto said stud member for tightening said connection and for causing said compressible washer to be forced into the polygonal side of said hole when said nut is tightened, said burrs biting into the said compressible washer when said nut is tightened, and means biting into said insulating washer when said connection is tightened for preventing rotation of said terminal stud with respect to said compressible washer.

8. A terminal connection for electrically connecting opposite sides of a plate member comprising, a hole in said plate member having a circular cross section over a portion of its length and a polygonal cross section over the remainder of its length, the diameters of the circular portion and polygonal portion being substantially equal, a terminal stud passing through said hole having a head located adjacent the polygonal side of the hole, a compressible washer interposed between said head and said plate member, and fastener means engaging said stud member, and reactive against said plate member for causing said compressible washer to be forced axially into the polygonal side of said hole when said fastener means is tightened.

9. A terminal connection for electrically connecting opposite sides of a plate member comprising, a hole in said plate member having a circular cross section over a portion of its length and a polygonal cross section over the remainder of its length, a terminal stud passing through said hole having a head located adjacent the polygonal side of the hole, a compressible washer having a diameter greater than the hole diameter interposed between said head and said plate member, and fastener means engaging said stud member, and reactive against said plate member for causing said compressible washer to be forced axially into the polygonal side of said hole when said fastener means is tightened.

10. A terminal connection for electrically connecting opposite sides of a plate member comprising, a hole in said plate member having a circular cross section over a portion of its length and a polygonal cross section over the remainder of its length, the diameter of the circular portion being substantially equal to the diameter of said polygonal portion, a terminal stud passing through said hole having a head located adjacent the polygonal side of the hole, a compressible washer of greater diameter than the diameter of said hole interposed between said head and said plate member, and fastener means engaging said stud member, and reactive against said plate member for causing said compressible washer to be forced axially into the polygonal side of said hole when said fastener means is tightened.

References Cited in the file of this patent

UNITED STATES PATENTS

| | | |
|---|---|---|
| 905,998 | Dorff | Dec. 8, 1908 |
| 2,388,054 | Hartzell | Oct. 30, 1945 |
| 2,448,766 | Burke | Sept. 7, 1948 |
| 2,812,381 | May | Nov. 5, 1957 |

FOREIGN PATENTS

| | | |
|---|---|---|
| 906,820 | Germany | Mar. 18, 1954 |